US006868396B2

(12) United States Patent
Smith et al.

(10) Patent No.: US 6,868,396 B2
(45) Date of Patent: Mar. 15, 2005

(54) METHOD AND APPARATUS FOR MONITORING INTERNET BASED SALES TRANSACTIONS BY LOCAL VENDORS

(75) Inventors: Kevin Lee Smith, Rockwall, TX (US); Robert MacGregor, Toronto (CA); William Glenwood Johnson, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 379 days.

(21) Appl. No.: 09/751,461

(22) Filed: Dec. 29, 2000

(65) Prior Publication Data

US 2002/0087505 A1 Jul. 4, 2002

(51) Int. Cl.[7] ............................................. G06F 17/60
(52) U.S. Cl. ........................ 705/27; 705/28; 705/29; 705/26
(58) Field of Search ............................. 705/26, 27, 28, 705/29, 2; 707/3

(56) References Cited

U.S. PATENT DOCUMENTS

| | | | | |
|---|---|---|---|---|
| 5,664,110 A | * | 9/1997 | Green et al. .................. | 705/26 |
| 5,983,200 A | * | 11/1999 | Slotznick ..................... | 705/26 |
| 6,282,517 B1 | * | 8/2001 | Wolfe et al. .................. | 705/26 |
| 6,381,583 B1 | * | 4/2002 | Kenney ....................... | 705/26 |
| 6,552,739 B1 | * | 4/2003 | Reed .......................... | 345/854 |
| 2002/0072984 A1 | * | 6/2002 | Rothman et al. .............. | 705/26 |

FOREIGN PATENT DOCUMENTS

WO    WO 00/43933 A1 * 7/2000

OTHER PUBLICATIONS

Tri–State Antique Center Homepage Layaway Policy. Nov. 8, 1999. Available Online (www.archive.org). pp. 1–4.*
Internet Publication. Farmington Community Library. Available online: www.farmlib.org/wreserve. May 19, 2000.*
Internet Publication, www.cars.com, About cars.com, Launched Jun. 1998, 5 pages.*

* cited by examiner

*Primary Examiner*—James S. McClellan
(74) *Attorney, Agent, or Firm*—Garlick Harrison & Markison, LLP; James Harrison

(57) ABSTRACT

An apparatus and a method are provided for facilitating the ability of a local organization to have its products or services displayed to a consumer on a computer monitor in a manner that facilitates their identification by the consumer in the local area. A search engine server is formed to display search results according to distance from the consumer. Search results are ordered in a specified manner that includes evaluating store location, product availability and price. With respect to store location, GPS coordinates are used if available to determine distances from the stores to the consumer. If GPS coordinates are not available, then a database that correlates postal codes is used to determine adjacent postal codes. Thus, search results are ordered in terms of highest priority being given to vendors in the same postal code, then to vendors in neighboring postal codes. Thereafter, priority is given to vendors whose postal codes are within the same city, then the same county, and finally, within the same state. The display results are generated with a graphical user interface that creates "buttons" to facilitate the user sending an e-mail message to the particular store, a hold request to hold a particular product, and to initiate a voice call between the consumer and the store.

20 Claims, 9 Drawing Sheets

METHOD AND APPARATUS FOR MONITORING INTERNET BASED SALES TRANSACTIONS BY LOCAL VENDORS

BACKGROUND

1. Technical Field

The present invention is generally related to systems for performing commercial activities over a general access computer network and, in particular, to a system and method of conveniently and efficiently displaying advertising and product selection to effectuate a purchase transaction over the Internet utilizing the World Wide Web.

2. Related Art

As the Internet is developed, it is creating substantial growth in the quantity and diversity of information and services that are readily accessible from the home or office. As the number of users of the Internet grows exponentially, the number of entities that use the Internet to market their products or services is also growing exponentially. As a part of attracting users to effectuate a transaction, a typical organization also provides the electronic equivalent of glossy brochures that define the company, its products, its philosophies and any other information that may help a user decide to purchase from that particular entity. Accordingly, the information that is made available through the Internet further encourages individuals to acquire the technology and skills to access the Internet.

A hypertext transfer protocol (HTTP), and more recently extensible markup language ("XML"), serves as a foundation protocol for the World Wide Web and has been widely adopted and implemented in web browsers and web servers. Web browsers provide a convenient user application for receiving generally high quality text and graphical information in a scrollable display page format. Such web pages are related by embedded hypertext links that reference other web pages. Thus, selection of a hypertext link, either by direct reference or implied reference through an image map causes a hypertext jump to the selection referenced web page. More specifically, the selection of a hypertext link prompts a browser of a computer to electronically couple to a website whose address is specified by the hypertext link.

From the user's perspective, however, selection is generally made through a simple, single mouse click on a displayed portion of the text or graphics. This system of simply selecting contextual relations makes browsing successive web pages served from potentially quite diverse and distance web servers convenient and intuitive. This user friendliness accounts, in large part, to the rapid and wide acceptance of the World Wide Web as an information resource.

As suggested already, one common use of the World Wide Web is to facilitate commercial transactions for products and services. The very nature of the World Wide Web, however, de-emphasizes geography because a user may receive the search results of a "brick and mortar" store within the user's immediate vicinity just as conveniently as the products of a store that is across the country or even across the world. As used herein, a brick and mortar store is a store in the ordinary sense such as a department store, a grocery store, a boutique, etc. In general, search results for a particular product, by way of example, are listed in an order specified by the server performing the search and are for "click and mortar" stores whose geographic location is transparent to the user. While a brick and mortar store can sell products over the World Wide Web as a click and mortar store, its specific locations become, nonetheless, transparent under common search engine display algorithms.

Typically, search results for a particular term or product name not only include hypertext links to locations that sell the particular product, but also hypertext links to publications, e-mail messages, web sites and other resources that include the particular search term. Thus, it is not uncommon for a particular search to yield hundreds or even thousands of search results containing a specified search term. To the user that must browse the search results to attempt to find an organization that actually has the product or service for sale that the user wants can be a time consuming task.

Worse yet, if the user prefers to patronize a service or goods provider within a local area, then, potentially, the user must review all of the search results to find those search results that meet his or her specific requirements. Even if a user has no particular loyalty to local vendors, the user may prefer to view, sample or try the particular product prior to deciding to purchase it. Even if the user plans to visit a local vendor, however, the user may still perform an Internet search to determine a reasonable price for the product and even to shop around for the best price provided by local vendors.

What is needed, therefore, is a system that facilitates the display and ordering (sequencing) of search results in a way that adds convenience to the individual performing the search. More specifically, a need exists for a system that enables the individual to determine what local establishments provide the desired goods or services. In general, it has been recognized by the inventors herein, that the World Wide Web and the methods of use therefor do not enable or facilitate the ability of local "brick and mortar" vendors to provide their goods or services to the local population. Accordingly, a need exists for such vendors to compete effectively for the local market with national and international service and goods providers. Stated differently, as the servers of the Internet become significant marketing pipelines, there exists an ever increasing need for local vendors to compete with national vendors in the particular markets.

For example, U.S. Pat. No. 5,963,915 to Steven T. Kirsch discloses a secure, convenient and efficient system and method of performing trans-Internet purchase transactions. Kirsch particularly discloses a method of using "cookies" to facilitate security and to enable one website to facilitate sales transactions for multiple vendors in only one connection or search. Kirsch does not facilitate using the Internet as a source for finding the best prices and closest locations. Kirsch does not facilitate a sale transaction between a user and a local and proximate vendor.

SUMMARY OF THE INVENTION

One advantage a local vendor has over nationally directed and location transparent sales/vendor organizations is proximity to the consumer. Thus, to overcome the shortcomings of the prior systems and their operations, the embodiments of the present invention contemplate an apparatus and a method that more enable vendors to compete more effectively for consumers in its local area. More specifically, the invention facilitates the ability of a vendor organization to have its products or services advertised on the Internet or World Wide Web displayed to a local consumer on a computer monitor in a manner that facilitates their identification by the consumer in the local area. Additionally, the search results are displayed along with a selectable "hold" option in a manner that enables the consumer to examine a particular product and also encourages the consumer to purchase the good or service from the vendor within the local area.

A store enters product and store information on a vendor server that communicates with a search engine server to create search results according to one embodiment of the present invention. More particularly, a store enters product information including price and availability along with a description of the product or at least a well known name for the product. The particular product information, however, is entered with respect to specific "brick and mortar" store locations. The vendors further enter a plurality of different types of contact information for each store including e-mail addresses, internet phone numbers (if available), public switched telephone network phone numbers (if available), fax number, street address and, if possible, GPS coordinates of the specific stores. The inventive embodiments thus enable vendors to better compete with national markets for the patronage of local consumers.

The search engine server in one embodiment is formed to produce sequenced search results according to a plurality of rules. If the locations of the stores (vendors) identified in the search results are known according to a coordinate system, such as the Global Positioning System (GPS), as well as the location of the consumer, the search engine server determines a distance for each store from the consumer and then orders the search results according to actual distance. If the location is known for only some of the vendors and for the consumer, the search results are ordered into two groups. The first group is the one for which actual distances may be calculated based upon the known locations. The second group includes the vendors whose GPS coordinates are not known. In this grouping, vendors in the same zip code as the consumer are listed first. Vendors in neighboring zip codes are listed second. Thereafter, vendors are listed in terms of being in the same city, and then the same county, and finally, in the same state. Additionally, the operator of the search engine server uses tiebreaker rules of price and product availability if a discrete geographic descriptor, such as a postal code, having a coarse degree of resolution, results in there being several results with an equal priority ranking. In an alternative approach, a mapping system is used to measure the actual drive distances according to street addresses between the stores and the consumer.

The search results further increase the consumer convenience of shopping on line in one embodiment in that hypertext links to enable the consumer to select to deliver an e-mail or similar message to the specified store listed in a search result with ease are included. Additionally, hypertext links to create a voice call either by way of the Internet or the public switched telephone networks are provided with the search results. The search results also include graphical user interface (GUI) option that includes a hypertext link formed to enable the consumer to request that a particular product be placed on to enable the consumer to test the particular product for suitability. Upon selection of the "hold" GUI, a server receiving the hold request generates a message to the specified store to hold the particular product for the consumer. The message may be generated automatically in the form of an e-mail message, a computer generated fax message, a short message service message to a cellular communication device, or even a general packet radio service message to a wireless communication device.

Finally, in one disclosed embodiment, a tracking number is generated for each search result. The search engine server transmits the tracking number to the consumer's user terminal for display. The tracking number further is inserted into communication signals generated to a specified store. The tracking number may be used for purposes of identifying the consumer when the consumer arrives at the store and for generating discounts to encourage use of the present system. Thus, the tracking number creates a system that allows the operator of the search engine server to be properly credited for placing the local consumer in touch with the vendor.

Other aspects of the present invention will become apparent with further reference to the drawings and specification that follow.

BRIEF DESCRIPTION OF THE DRAWINGS

A better understanding of the present invention can be obtained when the following detailed description of the various embodiments of the invention are considered with the following drawings, in which.

DETAILED DESCRIPTION OF THE DRAWINGS

Figure 1:
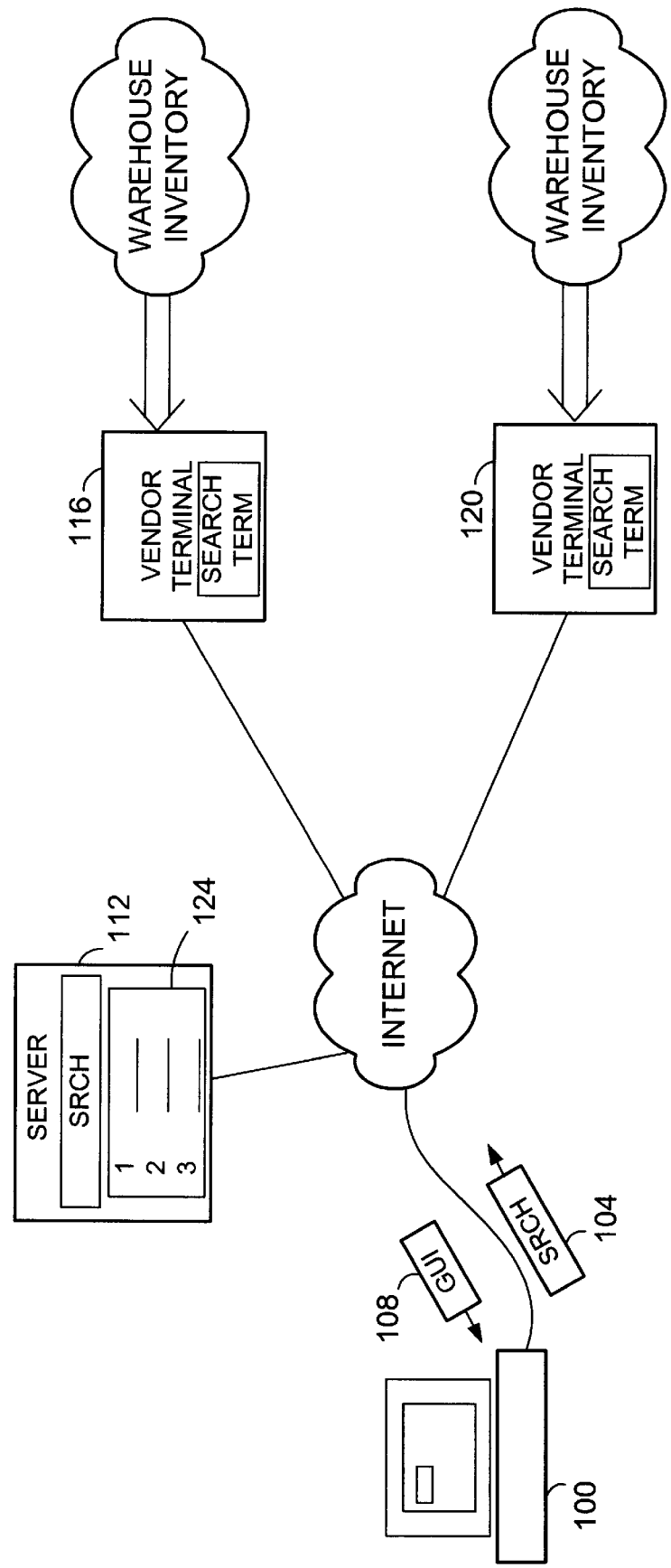
FIG. 1 is a functional diagram of a prior art system that facilitates sales transactions through the Internet.

FIG. 1 is a functional diagram of a prior art system that facilitates sales transactions through the Internet. As may be seen from referring to FIG. 1, a consumer 100 is coupled to the Internet to transmit search request 104 thereto and to receive search results 108. Typically, the search results will be transmitted in a graphical user interface (GUI) display format. As may be seen, a search engine server 112 also is coupled to the Internet and is coupled to receive search request 104 by way of the Internet to perform the specified search for sales and advertising information stored locally or remotely from the server 112.

Additionally, vendor terminals 116 and 120 also are coupled to the Internet, each of the vendor terminals including logic and data to define a web page, and information to cause the vendor terminals to respond to a search being performed by the search engine server 112. While shown to be a terminal of the actual vendor, it is also understood that vendor terminals 116 and 120 may alternatively or additionally include the equipment of an Internet Service Provider (ISP) that hosts a web page on behalf of the vendor. For example, regardless of whether the vendor terminal owned by the vendor or by an ISP, the vendor's warehouse inventory is input into the vendor terminal to interact with the search engine server 112 to enable the search engine server to determine what products are being sold by the vendors utilizing the corresponding vendor terminals 116 and 120.

In operation, therefore, the consumer 100 generates a search request 104 that is transmitted to search engine server 112. Search engine server 112 then communicates with each of the vendor terminals 116 and 120 to determine if their websites or inventories include the parameters identified in the search term 104. For each vendor terminal 116 or 120 returning a positive search response, search engine server 112 creates a list of search results shown generally at 124 that identify the product, perhaps a price, and the vendor that is providing the good or service. By way of example, the consumer 100 may be located in Dallas, Tex. while vendor terminal 116 is located in Seattle, Wash. and vendor 120 is located in Miami, Fla. While not explicitly shown, other vendors may be included herein, wherein those other vendors may be located anywhere in the world, including the Dallas/Ft. Worth Metroplex.

Figure 2:
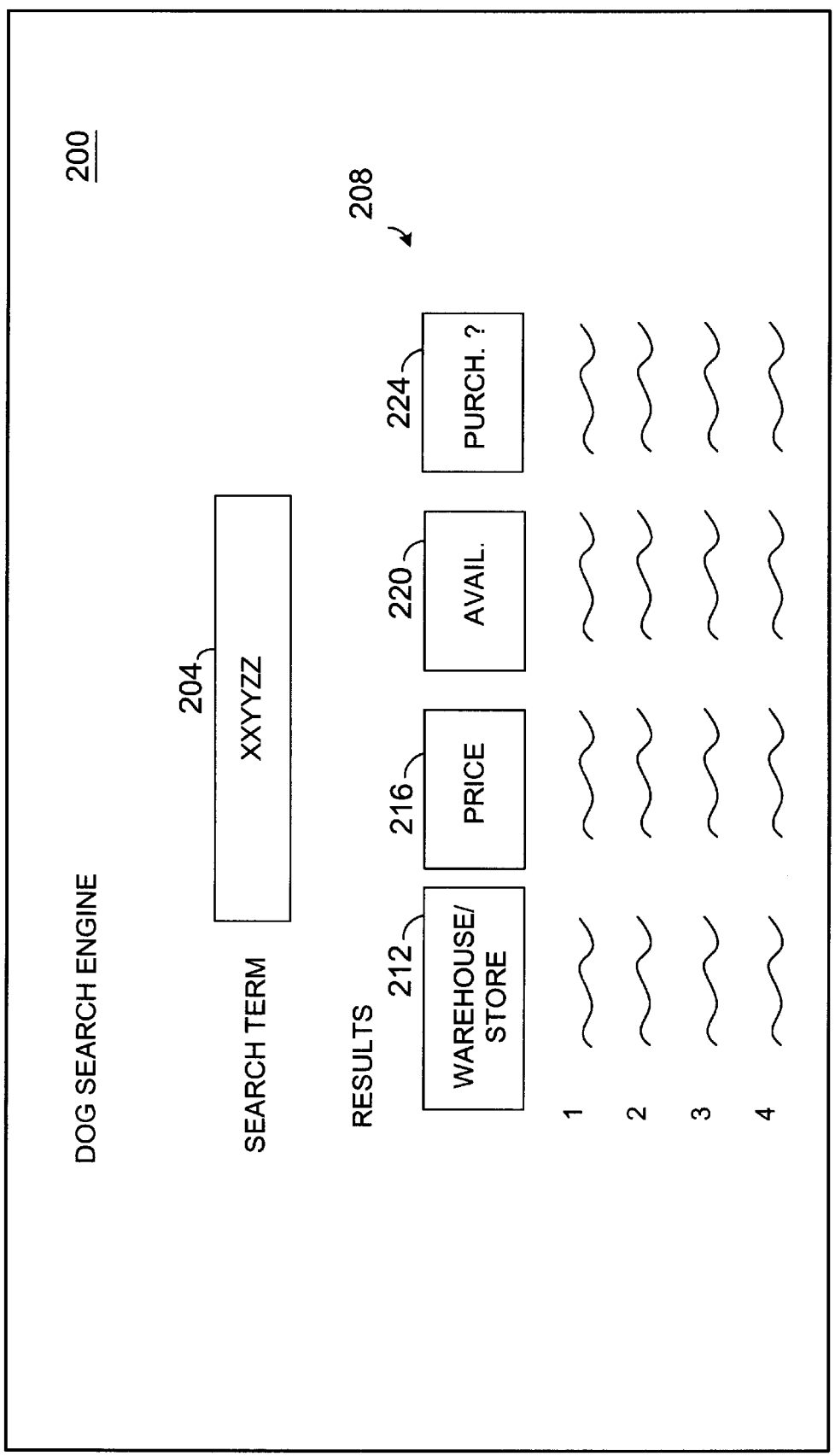
FIG. 2 is an illustration of a screen display created by a graphical user interface that is generated by a search engine server for display by a consumer terminal.

FIG. 2 is an illustration of a screen display created by a graphical user interface that is generated by a search engine server for display by a consumer terminal. As may be seen from referring to FIG. 2, a typical display 200 of search results generated by a search engine server include a field 204 that specifies the search term as well as the search results shown generally at 208. The search results typically include a plurality of tabular columns including columns 212 that identify the source of the good or product listed in the search results, columns 216 that indicate the product or service price, columns 220 that include an indication of product availability and column 224 to provide links to trigger purchase routines upon consumer selection indicating that the consumer would like to purchase the listed product. These links typically appear as a GUI "button" having a hypertext link protocol that connects the consumer by way of the Internet to a vendor specified address that triggers the vendor server to initiate a purchase routine.

Thus, for each of the columns, for example, row 1 illustrates a specific vendor having a product (or service) that includes the search term, its price, an indication of its availability and a GUI "button" that enables the consumer to select its purchase. Typically, the "button" actually is a hypertext link that would take the consumer to a specified page or that initiates a specified routine to enable the user to purchase the select product from the particular store listed in column 212.

Typically, search engine servers provide product search capabilities and sequence the search results according to price. Thus, the store having the lowest price would be listed in row 1 while the store with the highest price would be listed in row 4. Additionally, the search results typically include a GUI "button" to enable the consumer to request a product description for the items found in the search results.

Figure 3:
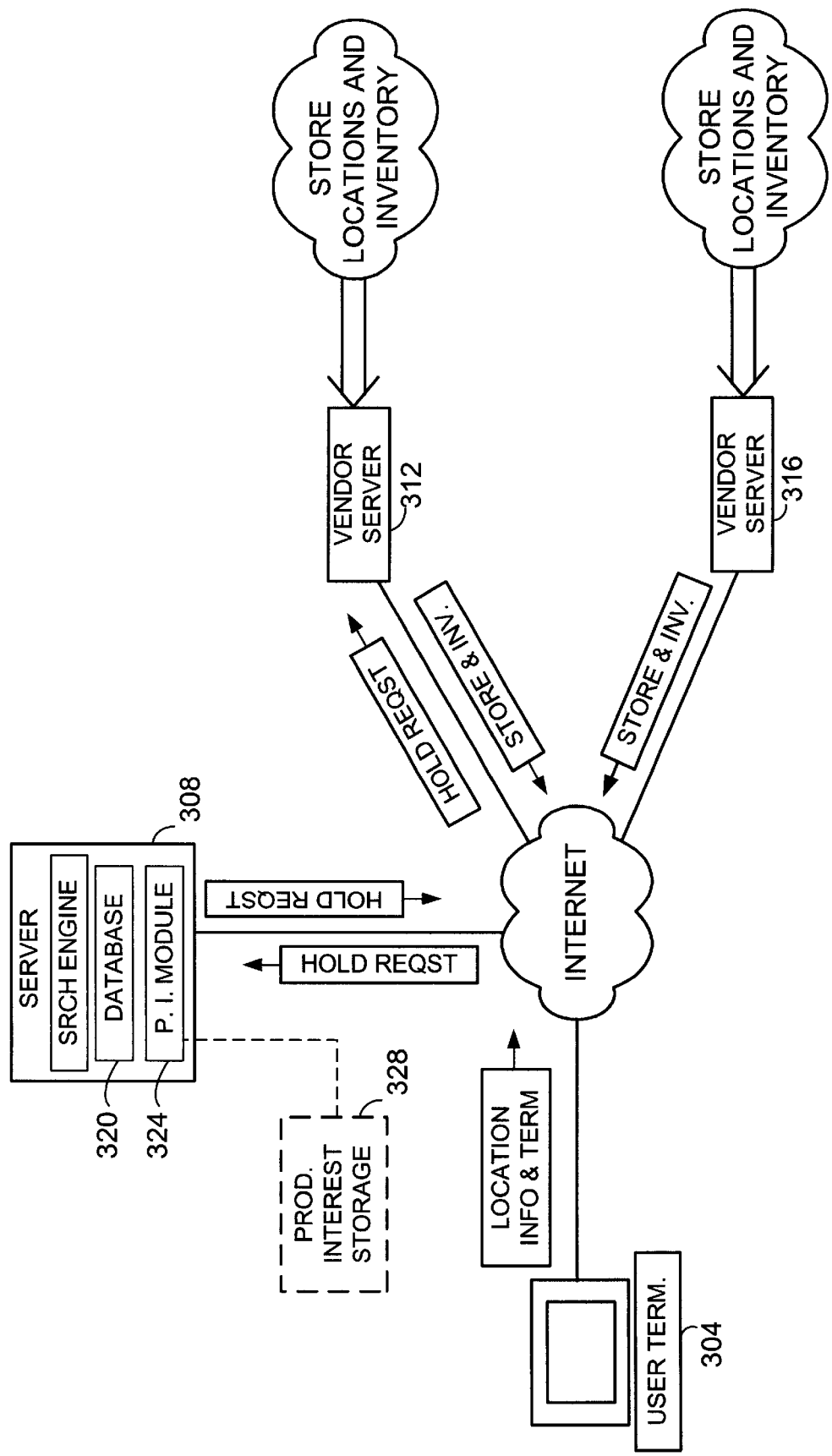
FIG. 3 is a functional block diagram of a communication network including at least one search engine server.

FIG. 3 is a functional block diagram of a communication network including servers formed according to an embodiment of the present invention. Referring now to FIG. 3, a consumer's user terminal 304 is coupled to the Internet. A search engine server 308 also is coupled to the Internet, as are vendor servers 312 and 316. Each of the vendor servers 312 and 316 are coupled to receive store locations and inventory information for each of the vendors whose products are made available through the Internet by the particular vendor server 312 or 316. Each of the vendor servers 312 and 316 are also formed to transmit store information as well as inventory information to search engine server 308 responsive to a search being performed by it. It is understood, of course, that the search engine within search engine server 308 may be formed within any one of many different systems and is not limited to servers similar to server 308. The scope of the present invention is not to be limited to search engines being formed solely within the search engine server similar to search engine server 308.

The store information not only includes the name of a particular store, but in the currently described embodiment of the invention, also includes the store location, a classification indicating the type of establishment or store, and more particularly, types of goods or services provided by the store, as well as contact information including telephone numbers, and e-mail and website addresses. In the event that a vendor server includes information for a plurality of store locations, the vendor servers are formed to transmit inventory information with respect to the specific locations of the various stores along with specific contact information for each store.

In operation, the consumer enters his location information and a search term or product name. The consumer's user terminal, in turn, transmits the same to search engine server 308 by way of the Internet. Search engine server 308 searches its geographically discrete contents and determines a list of vendors that include the product or service that is characterized by the search term. In one embodiment of the invention, the search engine performs real time searches as the search requests are generated by the consumer terminal 304.

In an alternate embodiment of the invention, the search engine server 308 maintains a list of vendors and their products and corresponding locations. Accordingly, when it receives a search request from consumer terminal 304, search engine server 308 may generate the search results based on information stored within. In this embodiment, the store and inventory information is not transmitted in response to a search request performed by search engine server 308, but rather, in response to an information request to enable the search engine server 308 to download the store location and complete inventory information for the particular vendors and their specific store locations.

In either embodiment, whenever a consumer terminal 304 generates a search term and specifies his or her location, search engine server 308 generates a sequenced list of search results that correspond to the search request. The sequenced list, as will be described in greater detail below, is ordered according to location wherein the closest locations are ranked first. Location ordering may be had on any known type of identification location information including post office location identifiers such as zip codes in the United States of America, GPS coordinates, street addresses in conjunction with mapping systems, and cellular network cell or cell sector locations. While much of this description herein utilizes the term "zip code", a well known postal code for the United States, any such reference specifically includes postal code systems from other countries or entities that define postal codes or other location grouping parameters.

In one embodiment in which location information is in the form of postal codes such as zip codes, search engine server 308 includes a database 320 for storing a list of all postal (zip) codes in a relevant geographic region such as the United States in a relational form so that search engine server 308 may determine the neighboring postal codes to a particular postal code. Accordingly, search engine server 308 is operable to create search results that are ordered first by the requested postal code, and then by the neighboring postal codes.

In another embodiment of the invention, GPS coordinates are used to track the user location as well as the locations of the stores. Accordingly, by knowing the GPS locations of the stores, search engine server 308 is operable to determine the distance from the searcher's location to the location of the store. This allows the server 308 to order the search results according to radial distance from the consumer to the particular vendor locations identified in the search results as long as the consumer's present location is known in terms of GPS coordinates. This particular embodiment is especially helpful for a user that is performing a search by way of a hand held or portable consumer terminal such as a lap top computer and a personal digital assistant or even a phone have text and internet search capabilities. Thus, as the user moves from location to location, the search results may vary if different stores are more proximate than what would have been displayed in a previous location.

As will also be described in greater detail below, search engine server 308 assigns a particular purchase code to each result listed and transmitted to the consumer terminal in the described embodiment of the invention. The purchase code facilitates payment to the search engine service provider for the benefits and services that it provides both to the vendors and users. By way of example, to induce the consumer to submit the specified purchase code, an arrangement may be had between the search engine service provider and the vendors wherein the user receives a discount each time an associated or specified code is used in a purchase transaction.

Accordingly, by contract between the vendor and the search engine service provider, the vendor then pays a commission to the search engine service provider. Alternatively, present methods may include merely providing the service for a fee to each of the vendors wanting to have their products listed within the search engine database. Even in this embodiment, however, an assigned code may still be desirable for data tracking purposes.

Whenever the search engine server 308 produces ordered results to the consumer, it also generates a hold request option in the form of a GUI button in the described embodiment of the present invention. Thus, if the consumer selects the hold request, a signal is transmitted to the search engine server 308 to indicate the consumer's selection. Responsive thereto, the search engine server 308 generates a message to a specified store location server to request the hold. The hold request, in the described embodiment of the invention, includes an assigned purchase code for enabling the consumer to identify the product being held at the particular store location. It also enables the operator of the search engine server 308 to obtain a credit or commission for facilitating a sale of the selected product if the sale materializes. Thus, as is indicated in FIG. 3, the hold request is transmitted from the consumer's user terminal to the search engine server 308. The search engine server 308 then generates a hold request and transmits it to the vendor server, e.g., vendor server 312.

In addition to database 320, search engine server 308 further includes a product interest monitoring module 324, which module 324 includes memory for storing product interest information according to the geographically discrete vendor locations identified within the search engine server 308. The product interest-monitoring module 324 may be formed either in hardware or logically in software or in a combination thereof.

The operational logic of product interest module 324 is formed, in the described embodiment of the invention, to record any response request to a search result regardless of whether the response is a hold request, a call request (as indicated by selection of the voice button) or a purchase request regardless of whether transmitted by e-mail, facsimile, SMS message, or other form of relaying messages to parties. In particular, the invention includes in one described embodiment of the invention, the recorded responses are made with respect to the resolution of geographically distinct locations as identified within the search engine server 308.

Continuing to refer to FIG. 3, a product interest storage device 328 is coupled to communicate with the product interest module within search engine server 308. Product interest storage device 328 comprises memory for storing product interest information. It is shown with dashed lines to reflect that it is an optional component of the system. The product interest parameters may also be stored within memory of search engine server 308.

As is described herein, the search engine server 308 includes a database that lists product information according to discrete geographic descriptors and is able to generate search results that are sequenced according to distance or location relative to the user. The search engine server 308 is able, therefore, to monitor product interest (meaning hold requests and sales) according to specified geographic parameters including zip code, city, county, state, etc. Customized geographic parameters may also be used. For example, a certain region of a town may be monitored for product interest.

The ability of the search engine server 308 to monitor product interest is particularly helpful to a store wanting to minimize inventory and wanting to only invest in inventory that is popular in its geographic area. Stated differently, the capabilities of search engine server 308 enable stores to distribute the risk of tying up money in inventory.

For example, in one embodiment of the inventive method, the server 308 would perform search requests for products, list search results on a store by store basis, determine if the product search request is one that is to be monitored for product interest (as specified in a stored list), record all transactions relating to the product search request including hold requests and purchase requests, record a geographic description of the stores for all transactions relating to the product search request (by any of the described location parameters), analyze saved records to determine product interest in a defined geographic area and produce a report containing information relating to the analyzed saved records. The produced report, for example, could be downloadable by all stores whose products are listed by the server, or by a select list of subscribing stores. Thus, the inventive method in the described embodiment includes determining whether an individual requesting the report has access privileges to the report.

Figure 4:
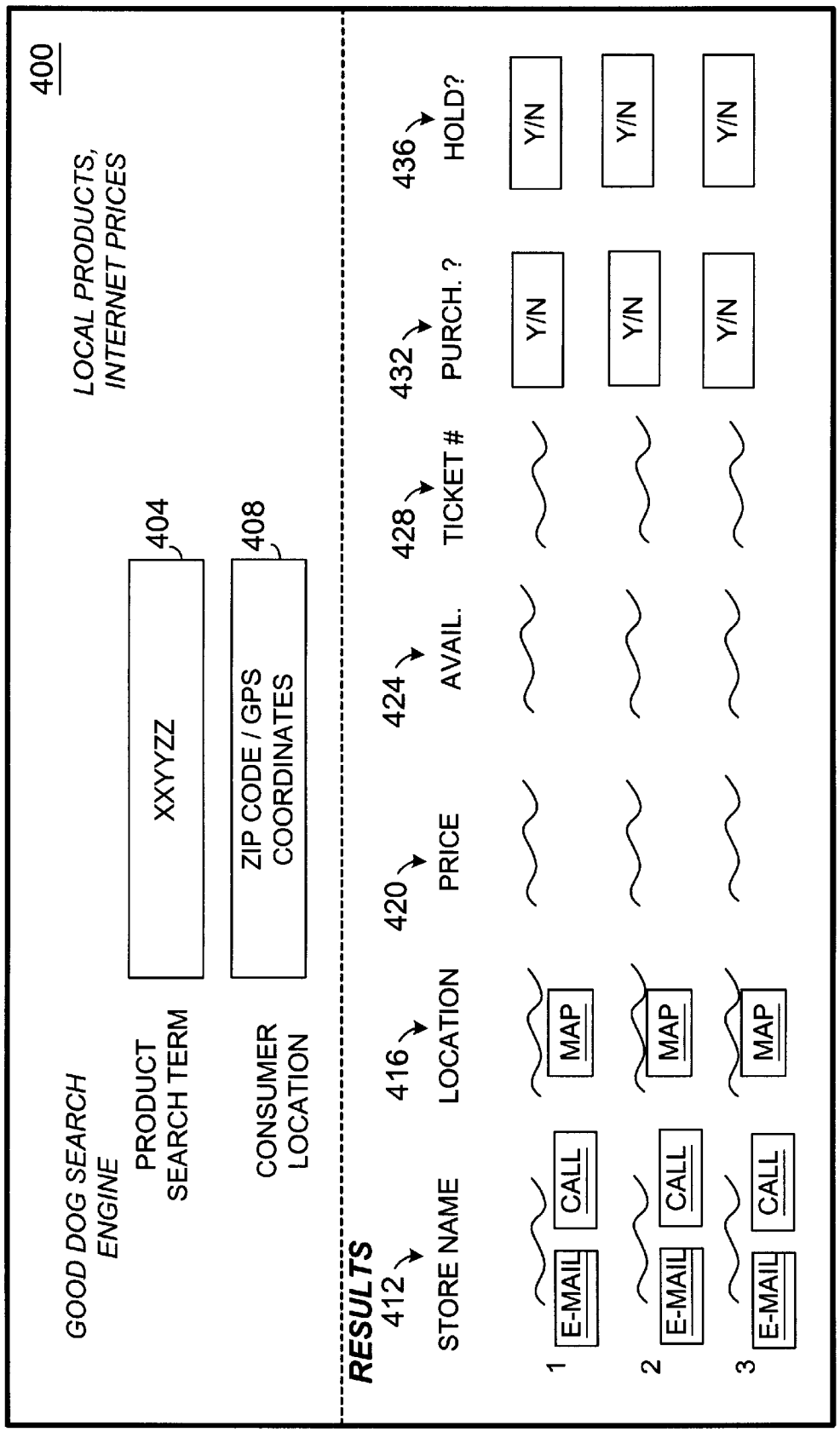
FIG. 4 is an illustration showing a graphical user interface display screen that includes a GUI hold button.

FIG. 4 is an illustration showing a graphical user interface display screen according to an embodiment of the present invention. Referring now to FIG. 4, a typical results display screen 400, according to one embodiment of the invention, includes a window 404 for displaying the search term and a window 408 for displaying the requested area or location. As described before, the requested area shown in window 408 may be either by city area, by zip code, or even by location coordinates specified either by street address or GPS location. With respect to the actual results, pluralities of different columns of information are displayed for each search result.

First, in a column shown generally at 412, the name of the specific store that sells the product is listed. In addition, in one embodiment of the invention, the store name listing also includes at least one of a hypertext link to enable the user to transmit an e-mail message to the store and a hypertext link to operate as a "voice button" to automatically set up an Internet based phone call to the specific store identified in column 412. Moreover, the results are directed particular stores or vendors. Accordingly, a plurality of stores of a particular chain of stores (e.g., a franchise store) may be listed because each store is treated as its own entity for the purposes of sequencing and listing search results.

In column 416, however, the location of the store is listed. In addition to information that identifies the store location, column 416 includes a plurality of hypertext links to enable the user to obtain directions to the store, to have a map showing the geographic location of the store, such as those mapping services provided by Map Link™ or other similar services. The price of the item is displayed in column 420 while an indication of whether the product is available at the specified store is displayed in column 424.

Column 428 provides a tracking number for the specified product. Accordingly, as mentioned before, the tracking number shown in column 428 may be used to provide a way of identifying the search engine server that provided the search result. Also, as discussed before, to motivate a consumer to provide the tracking number (code) at the particular store identified in column 412, a system may be created in which the vendor generates a discount to the consumer for using the tracking number. The tracking number may be in the form of a string of digits or, alternatively, in the form of one or more symbols that are more readily recalled by the consumer in the event the consumer does not have the tracking number with her at the store. Such motivational approaches, however, are not necessarily included as a required feature—of the invention.

Column 432 is for providing the user with an option of purchasing the product over the Internet. Thus, if the user selects the hypertext link shown in column 432, then purchase transactions routines are generated to obtain payment information and mailing information. On the other hand, the display 400 also includes a column 436 that enables the user to request that the specific store identified in column 412 hold the specific product identified in window 404 until the consumer can go to the store to examine the particular product. Thus, in the described embodiment, if the user selects the hypertext link shown in column 436, a message is automatically generated by the search engine server to the specified store listed in column 412 at location 416 to place a hold on one of the particular product items in stock.

Referring back to column 412, many different approaches may be utilized to provide the capability of generating an e-mail message or an Internet voice call. With respect to the e-mail message, the selection of a hypertext link would trigger a routine within the search engine software to prompt the consumer's user terminal to activate its e-mail software to generate an e-mail message. In this embodiment, the e-mail address of the store is automatically be inserted into the "To" field. In an alternative embodiment, the hypertext link is used to create a direct connection to the search engine to generate an e-mail message that is to be transmitted by the search engine server itself. In such an embodiment, the search engine server generates a graphical user interface screen to the user to prompt the user to enter whatever required information is necessary for the search engine server to generate the e-mail message.

With respect to the voice button, if the user selects the hypertext link for the voice button, then the search engine server facilitates the creation of a connection between the consumer's user terminal and a server that provides telephony services to generate a call from the consumer's user terminal to the specified store location. In such an embodiment, either an Internet voice call is established between the consumer's user terminal and the specified location or, alternatively, a public switched telephone network call is created from the consumer's user terminal to the specified location. Alternatively, an Internet voice call is created from the consumer terminal to an IP telephony service provider and a public switched telephone call is created from the service provider to the specified location. Accordingly, in this embodiment, the IP telephony service provider converts the Internet call to a public switched telephone network call and couples the two calls to each other acting as a gateway device.

Figure 5:
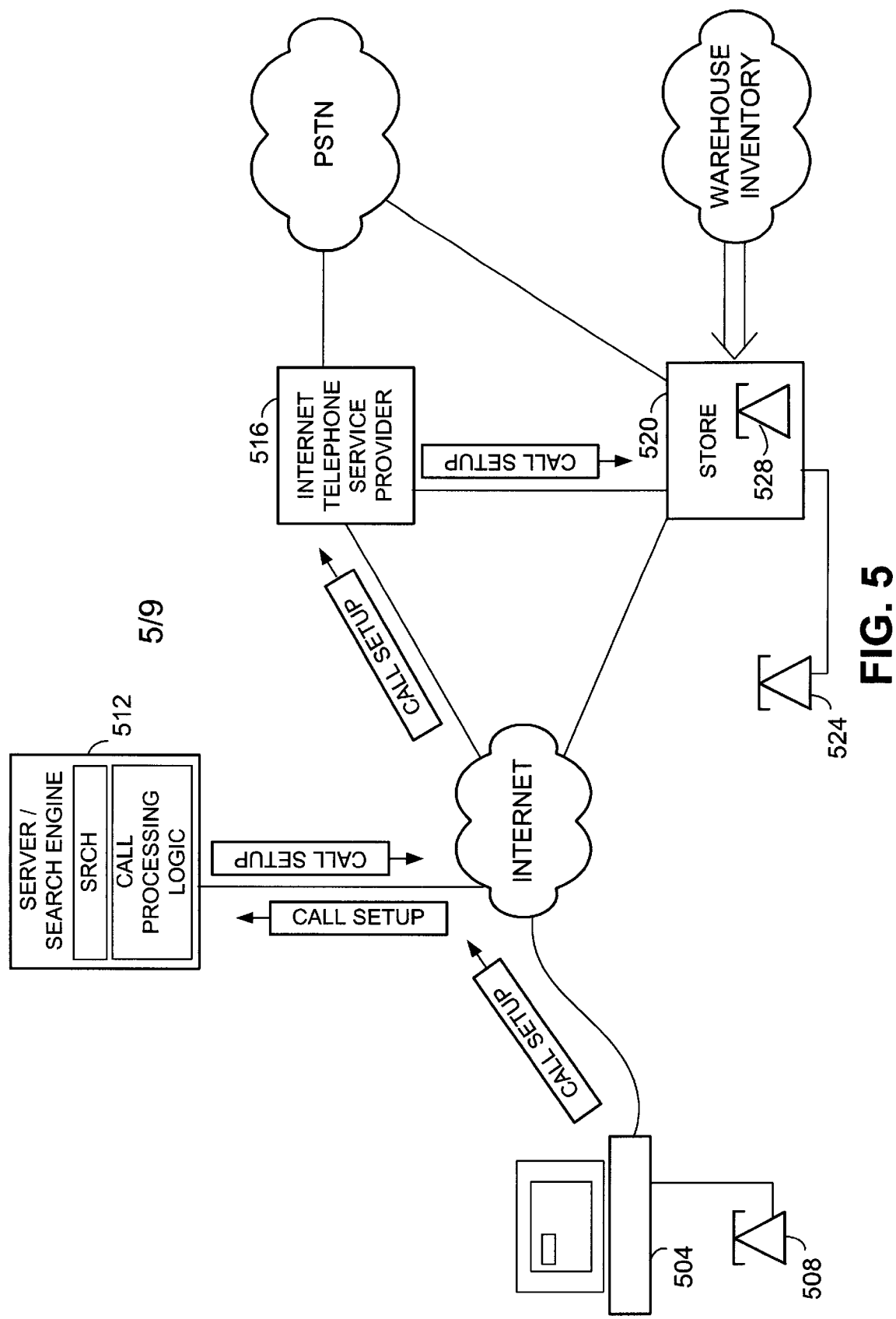
FIG. 5 is a functional block diagram that illustrates a network in which a consumer's user terminal may be connected to a vendor at a specified location for a voice call to discuss a particular product list in the consumer's search results.

FIG. 5 is a functional block diagram that illustrates two different ways in which a consumer's user terminal may be connected to a vendor at a specified location for a voice call according to an embodiment of the present invention. Referring now to FIG. 5, a consumer's user terminal 504 is coupled to a telephone 508. Telephone 508 is Internet compatible and is formed for placing and receiving Internet voice calls. While FIG. 5 shows telephone 508 as a distinct device, the telephone may be formed within consumer terminal 504 wherein a speaker and microphone are formed either as a part of consumer terminal 504 or separately but wherein the circuitry for creating the Internet phone call is within the consumer terminal 504. Alternatively, consumer terminal may merely include an input for receiving and transmitting telephone communication signals with Internet telephone 508.

A search engine server 512 is coupled to communicate with consumer terminal 504 by way of the Internet. Thus, in the present embodiment of the invention, if the user were to select the voice button hypertext link on his search results, a signal reflecting the selection is produced to search engine server 512 to prompt it to initiate a routine to place an Internet phone call to the specific store identified in column 412 of FIG. 4. As may be seen, search engine server further includes a call processing logic module for initiating call setup signals, as is describer herein.

The search engine server 512, as a part of initiating that call, provides the IP address of a communications service provider including but not limited to telephony service providers, Internet service providers, etc. By way of example, an IP telephony service provider compliant with the may be used to create a call between phone 508 and telephony service provider 516. As a part of the signaling received by telephony service provider 516, it receives a destination IP address. Alternatively, a called party public switched telephone number may be provided to the telephone service provider.

Based upon the type of destination number (IP address or phone number) received, the telephony service provider either routes an Internet voice call directly to the specified store 520, if store 520 has an Internet phone 524 similar to phone 508, or, if not, through the PSTN to a traditional PSTN compatible phone 528. In one embodiment of the present invention, search engine server 512 includes information that indicates whether the specified store location includes an Internet telephone 524 or merely a PSTN phone 528. It is presumed, that for the near future, any store having an Internet phone 524 may also have a PSTN compatible telephone 528.

Alternatively, Internet phone 524 may also be formed to be PSTN compatible to serve as a PSTN phone 528. Thus, as part of setting up a voice call between consumer terminal 504, and more specifically, between Internet phone 508 and the specified store, search engine server 512 determines whether the store includes an Internet phone, and if so, communicates with telephony service provider 516 to provide the relevant information so that telephony service provider 516 may route the call to the specified store either through the Internet or through the PSTN, respectively. Such relevant information includes, for example, an IP address of phone 528.

Figure 6:
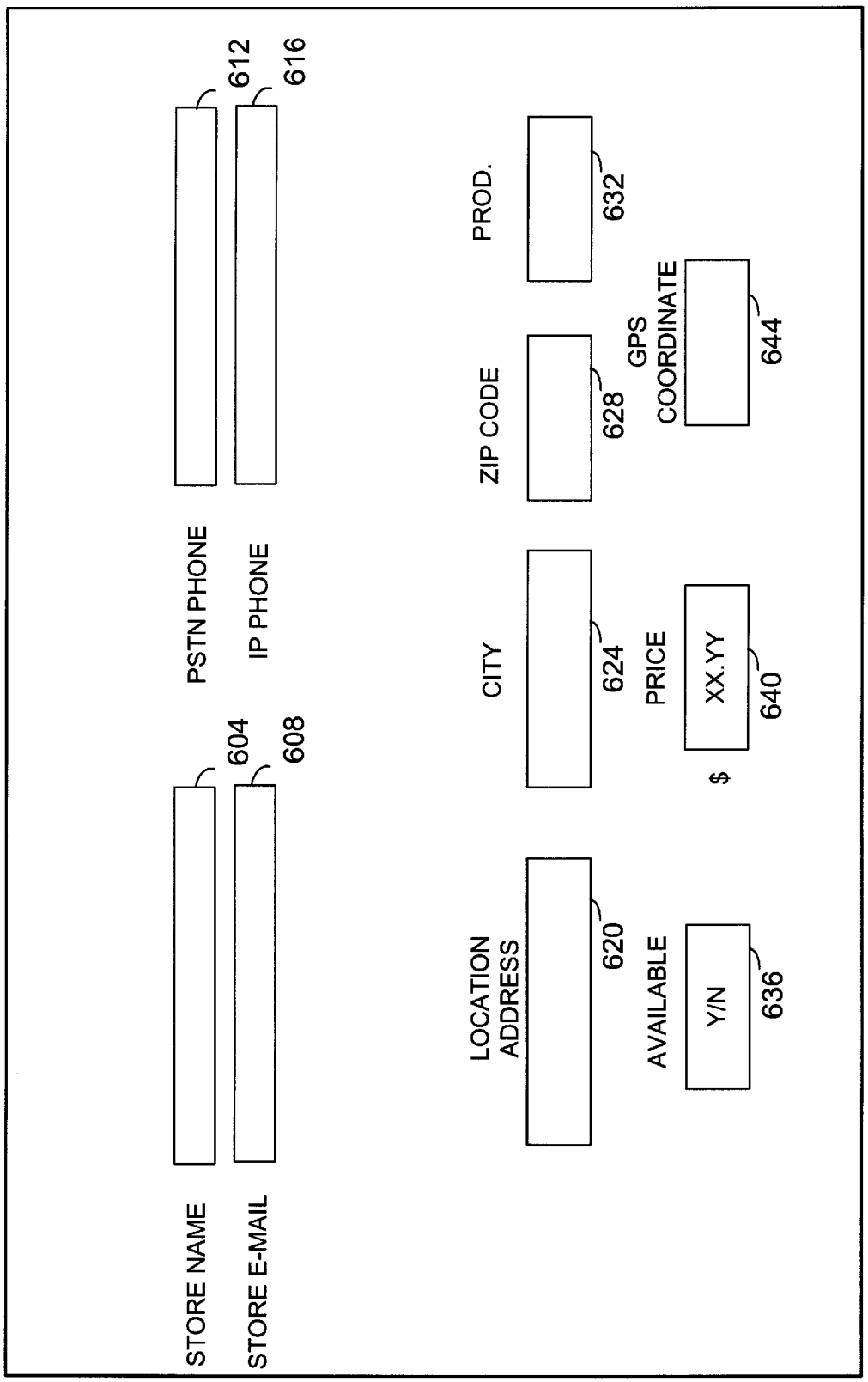
FIG. 6 is an illustration of a typical graphical user interface display screen to enable a store to enter its product information for uploading to the search engine server.

FIG. 6 is an illustration of a typical graphical user interface display screen that is used in one embodiment of the invention to enable a store to enter its product information for uploading to the search engine server. As may be seen, the display screen of FIG. 6 includes a field 604 for identifying the store by name and a field 608 for identifying the store e-mail address. Additionally, the display includes a field 612 for entering a PSTN phone number and a field 616 for entering an IP phone number. As is understood, the IP phone number 616 that is to be entered into field 616 is in the form of an IP address.

Additionally, for each store, graphical user interface fields are created to enable the store to enter additional specific location and product information. For example, field 620 is for entering the store street address while field 624 is for entering the store city. Field 628 is for entering the store postal code (e.g., zip code in the US). In an alternate embodiment of the invention, an additional field 644 is created for entering a GPS coordinate of the store.

In yet another alternate embodiment, either field 624 or 628 may be used for entering the store's GPS coordinates. In such a case, the search engine server analyzes the form of the data entered therein to determine the type of coordinate data that was entered. In general, the GUI display screen of FIG. 6 includes fields for entering location information according to the type of location ordering that is to be performed by a search engine server formed according to anyone of the embodiments and equivalent variations therefor. FIG. 6 illustrates several exemplary types of information that may be entered according to design choice. Any combination of the differing types of location information may be utilized in the various embodiments of the invention. Thus, the fields of FIG. 6 that are for entering location information relate to the design choices and types of location parameters used in implementing the inventive system.

Field 632 is for entering specific product information such as the product name, manufacturer name, and a description of the product including its model number and, if applicable, color and/or size. Additionally, a field 636 is provided to indicate whether the product is presently available. Field 640 is for indicating the price of the product. The search engine server, in one embodiment, builds a database from each entry made by a vendor on a page similar to that shown in FIG. 6. Alternatively, the information of FIG. 6 is stored by a vendor server and is produced in response to queries by the search engine server performing a search for the consumer.

Figure 7:
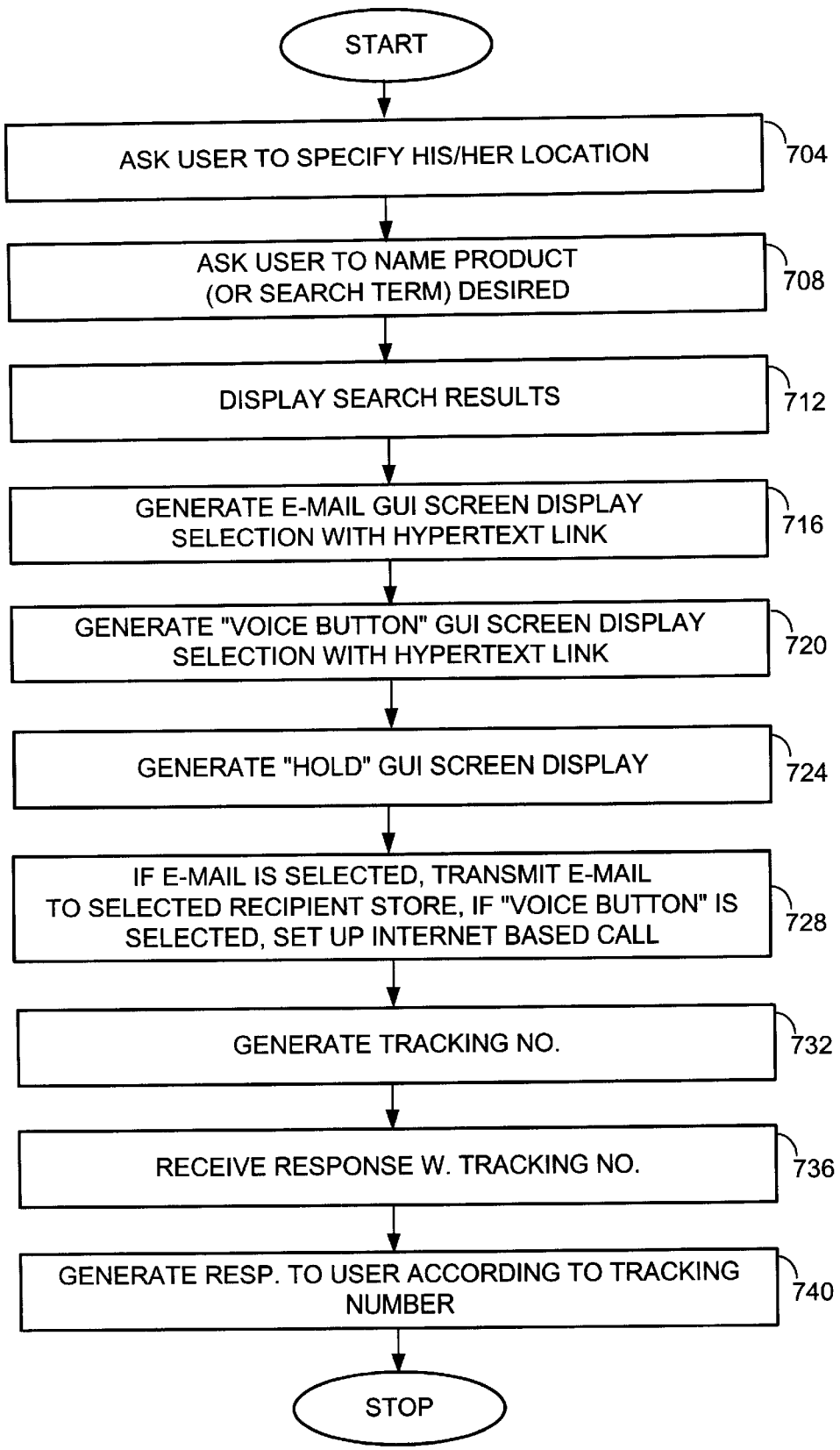
FIG. 7 is a flow chart illustrating a method for facilitating a consumer transaction over the Internet.

FIG. 7 is a flow chart illustrating a method for facilitating a consumer transaction over the Internet according to an embodiment of the invention. Once a user has activated a search engine server to perform a search for a particular product or service, the search engine server prompts the user to specify his or her location (Step 704). As has been described elsewhere, the location can be specified either by address, zip code, or GPS coordinates. Additionally, the search engine server generates signals to transmit to the user to ask the user to name the product or service (or a search term that identifies the same) that is desired (Step 708).

Thereafter, the search engine server displays the search results (Step 712). Here, the search results are displayed according to location and then price. As has been described before, the search results can be obtained in real time by the search engine server or may be generated according to data stored within an internal database that is periodically updated. Also, as has been described elsewhere herein, the search results are ordered in terms of distance from the user location.

Thus, if the consumer entered a zip code as the type of location indicator, then all of the stores that sell the product or service described by the search term that are located within the same zip code as the consumer are listed first. Thereafter, stores that are within an adjacent zip code area to the specified zip code are listed. Then, the stores that are within the same city and then county and then state are listed. Thereafter, search results are listed according to another ordering scheme or tiebreaker rules.

Generally, the invention embodiments include ordering search results according to location. Thus, if the consumer entered his specific address and zip code, known mapping software and/or servers may be used to determine the driving distance to the particular stores for ordering the search results. If GPS coordinates are used, then vector distances that may be calculated are used for ordering search results. Finally, if only zip codes are available, zip codes are used wherein the stores having the same zip code (or other postal identifier) are listed first followed by those stores in neighboring zip codes.

Additionally, for each of the prior search result priorities, to the extent the search results include multiple stores within the same zip code, or within one of the other groupings including neighboring zip codes, or zip codes within the same town, county or state, a second rule is used as a tie breaker rule to order the results. In one embodiment of the present invention, they are ordered first by location and then by price. A third tiebreaker rule might be product or service availability. Alternatively, the second tiebreaker rule for ordering may be availability and the third tiebreaker rule may be price.

One issue that exists for embodiments that include the use GPS coordinates for determining distance and ordering results is that some locations may not list GPS coordinates while others do. In one embodiment of the present invention, stores whose defined locations include GPS coordinates are listed together according to the specified search display tiebreaker rules. Thereafter, those stores whose defined locations do not include GPS coordinates are listed together according to the specified search display tiebreaker rules. If a consumer only specifies his or her zip code, however, then the search results are arranged by zip code as described herein even if the stores have specified GPS coordinates in their location descriptions. In yet another embodiment, however, a database is accessed to determine a user's GPS coordinates as well as, if necessary, the GPS coordinates of any store listed within the search results.

As a part of displaying the search results, the search engine server generates a set of GUI display signals with a hypertext link for display on the consumer display (Step 716) to enable the consumer to initiate a routine to generate and sends a communication to a particular store having a particular product as shown in the search results (step 714). As may be seen in FIG. 7, the step of sending a communication listed as step 714 includes one or more different types of communications. The method of FIG. 7 thus includes one or more of these types of communication.

For example, the search engine server generates a selectable GUI display to enable the consumer to prompt the generation of an e-mail message to a particular vendor at a listed location described in the search results (step 716).

Additionally, the search engine server generates a set of GUI display signals with a hypertext link for display on the consumer display (Step 720) to enable the consumer to prompt the creation of a voice call with a particular store having a particular product as shown in the search results (step 720). The voice call may be either purely an Internet based call or a call that includes a connection through a public switched telephone network. While not shown herein FIG. 7, it is understood that selectable GUI "buttons" may be created to prompt other types of communications include text paging, short message service message deliver, facsimile, etc.

In addition to the e-mail and "voice button" GUI display signals, the search engine server generates a set of GUI display signals with a hypertext link for display on the consumer display (Step 724) to enable the consumer to initiate the transmission of a message to a particular store to prompt the store to hold a particular product for the consumer. By way of example, the search engine server may generate an e-mail message identifying the product and the consumer requesting a hold. Alternatively, the search engine server may generate a facsimile or a short message service message for delivery to the particular store's cellular phone service or a message using a newer type of digital packet transmission such as the General Packet Radio Service (GPRS).

With respect to the e-mail that may be generated upon selection of the "e-mail" hypertext link, the search engine server itself generates the e-mail message. Accordingly, an e-mail type graphical user interface screen is generated and transmitted to the user to prompt the user to enter necessary information that is to be transmitted to the specified store. Thereafter, the search engine server receives the content information for the e-mail message and transmits an e-mail message to the specified recipient store. Alternatively, software within the consumer terminal generates the e-mail message that is received by the search engine server and is transmitted to the recipient store. Thus, if the consumer selects "e-mail", the search engine server delivers an e-mail message to the store and if the consumer selects "voice button", a voice call is set up between the consumer and the store (Step 728).

Additionally, as part of generating and transmitting the e-mail message or a fax or SMS or GPRS message, the search engine server generates a unique tracking number that identifies it as the search engine server that performed the search and that uniquely identifies the search. The tracking number also is generated for display to the consumer and is inserted into the e-mail message either by the consumer terminal or by the search engine server (Step 732). Generally, the tracking number assists in identifying the manner in which the consumer became aware of the store and its product selections and availability.

The above described communications may include a hold or purchase request. Additionally, the communication may be generated in any of the described forms or new communication forms that have not yet been developed. Once a communication is generated to a particular store, a record of the communication detailing the product or service identity as well as the identity of the source of the product or service is stored (step 736). The record may be stored either within the search engine server or it may be transmitted to a remote system for maintaining product interest records.

Accordingly, when the user performs any type of product selection including the mere generation of an e-mail message regarding a product selection, all such electronic correspondence occurs with respect to the generated tracking number. Accordingly, the search engine server receives a response that includes the tracking number (Step 736). Thereafter, for all communications regarding the particular product or service that has been selected by the user, responses to the user and transmissions to the store include the tracking number for reference purposes (Step 740).

One aspect of the present invention includes use of a "voice button" for setting up a voice call between the consumer and a particular store listed in the search results. Thus, the placement of the call is recorded with respect to the tracking number. As is explained elsewhere, the tracking number may also be used to generate discounts to prompt consumers to use the tracking number so that a credit may properly be allocated to the operator of the search engine server.

Figure 8:
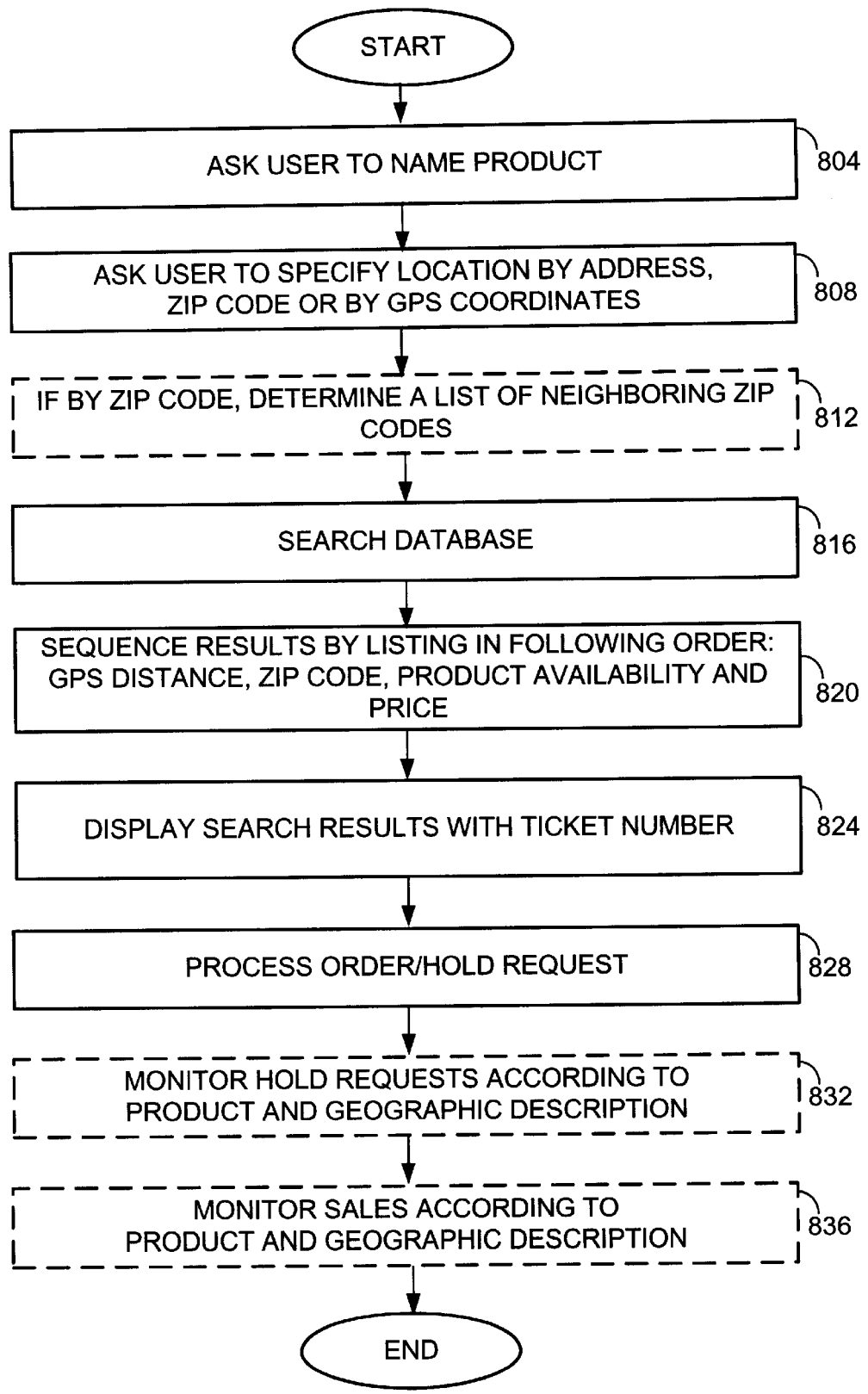
FIG. 8 is a flow chart illustrating a method for generating and displaying search results.

FIG. 8 is a flow chart illustrating a method for generating and displaying search results according to an embodiment of the present invention. Initially, a search engine server prompts a consumer to specify a search term that relates to a product or service that he or she wishes to search (Step 804). Thereafter, the search engine server asks the user to specify a shopping location by city name and state, or by postal code, or by GPS coordinate or by address (Step 808). If by address, the search engine server, in one embodiment, translates the address to a coordinate system, by way of example, GPS, so that it can readily determine distance to a store from the user location. In another embodiment, the addresses are translated into actual driving distances with data stored within the mapping software/system.

If by postal code, the search engine server determines a list of neighboring zip codes as specified within an internal database (Step 812). Thereafter, the search engine server searches its database or performs a real time search over the Internet for the requested product or service (Step 816). Thereafter, the search engine server arranges results (Step 820). In one embodiment, it arranges the results by sequencing them in the following order: by driving distances determined with the distances stored by a mapping system, by vector distances if GPS coordinates are known for the consumer and the particular stores found in the search results, by zip code or postal code wherein those search results within the same zip or postal code are listed first, those search results within geographically neighboring zip or postal codes are listed second, those search results listed within the same city are listed third and those search results listed in the same county or state are listed fourth and fifth, respectively (Step 824).

Thereafter, the search engine server processes any order or hold request specified by the user (Step 828). A hold request is one in which the user has indicated an interest in a particular product at a particular location. Thus, the search engine server generates a message to the particular store to request that the specified product be held for the user to examine (Step 828). As one aspect of the present invention, the tracking number may be used to process the hold request so that the user and the manner in which the hold request was generated may be identified by the store when the user goes there to examine the product. This facilitates not only that the user is potentially entitled to a discount, but also creates a method of providing credit to the server that produced the results for the user.

Having a method of facilitating a sales commission to the server encourages, of course, the creation of the server to support the invention described herein. The use of a tracking number is not required, however, as other methods for crediting the server may be utilized including, for example, a summary report by the server of all hold/purchase requests that resulted from the search results it generated.

As another aspect of the present invention, the search engine server monitors hold requests according to product and geographic descriptions (Step 832). Additionally, the search engine server monitors purchase transactions according to product and geographic descriptions (Step 836). By monitoring product interest (hold requests and sales) by geographic descriptions, the search engine server further is able to generate reports that list product demand by geographic area. Accordingly, individual merchants and stores are able to distribute the risk of tying up money in unpopular product inventory until such time that it becomes clear that a product is in demand in the geographic area in which the store is located.

Figure 9:
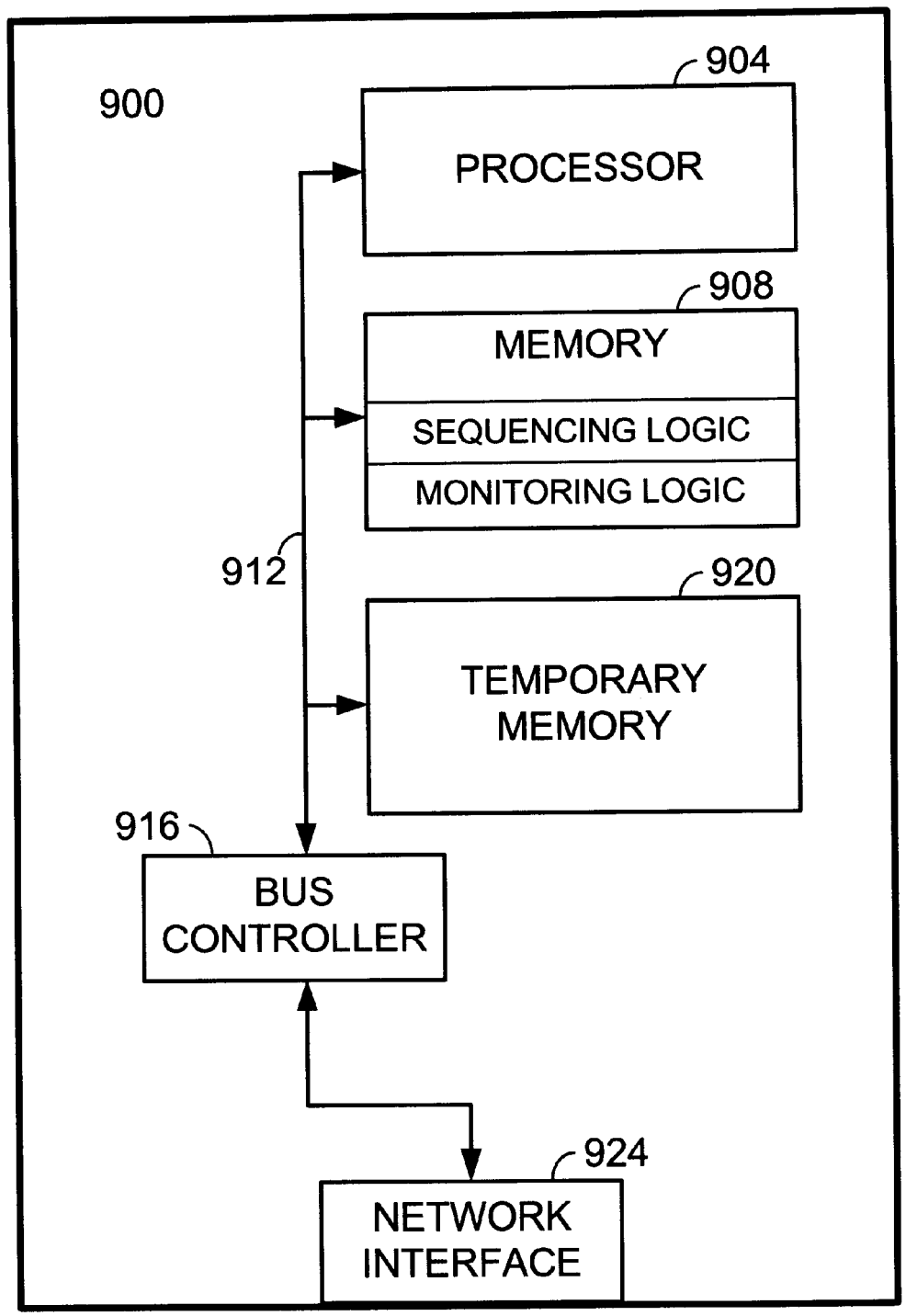
FIG. 9 is a functional block diagram illustrating exemplary circuitry for a server that arranges search results, monitors consumer interest in products and facilitates the consumer's ability to communicate with a specific store to discuss a particular product listed in a search result.

FIG. 9 is a functional block diagram illustrating exemplary circuitry for implementing the described embodiments and equivalents therefor of the present invention. Referring now to FIG. 9, a search engine server 900 includes a processing unit 904 and a memory 908. Memory 908 is for storing computer instructions that define the operational logic described herein this application. As may be seen, memory 908 particularly includes computer instructions that define the operational logic of the inventive server/search engine server including the sequencing logic for sequencing results according to discrete geographic descriptions as stored with a database and monitoring logic for monitoring product interest according to geographic descriptions.

The discrete geographic descriptions include all types of location indicators including postal codes (e.g., zip codes), GPS coordinates, street addresses, etc. It is understood, of course, that the memory further includes a database that lists store inventory information including location information and logic for determining a user's distance from the particular stores listed within the database. Processor 904 and memory 908 are both coupled to a bus 912 whose operation is controlled by a bus controller 916.

In operation, processing unit 904 receives the computer instructions from memory 908 over bus 912 to execute the computer instructions to perform the inventive methods and processes described herein. As a part of executing those computer instructions stored within memory 908, processing unit 904 temporarily stores data and information within temporary memory 920 as a part of executing the computer instructions stored within memory 908. Bus controller 916 also is coupled to a network port 924. Network port 924 is the port through which the search engine server 900 communicates with other external devices by way of the Internet or other network.

Thus, as processing unit 904 executes the computer instructions stored in memory 908, communication signals are transmitted over bus 912 through bus controller 916 and are transceived from the search engine server 900 through network port 924. Results and signals transmitted by other systems intended for search engine server 900 are also received through network port 924 and are stored by bus controller 916 in temporary memory 920 to enable processing unit 904 to interpret and respond to the received signals accordingly.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

Additionally, the computer instructions may be modified to create permutations of the inventive methods or signals whose differences from what is disclosed and claimed are insubstantial. Moreover, alternative design approaches may be implemented. By way of example, the server of FIG. 9 may be formed alternatively in hardware or in a combination of hardware and software that is executed by a processor. As may be seen, the described embodiments may be modified in many different ways without departing from the scope or teachings of the invention. Additionally, the system may be modified to communicate with a wireless network and to obtain location information of the user as is known by the wireless network. By way of example, the user location may be a coordinate produced by a triangulation algorithm or may be defined by sector wherein the server is formed to sequence search results according to proximity to the sector.

What is claimed is:

1. A method in a search engine, which is executable on a server, for facilitating an Internet-based transaction corresponding to a vendor inventory comprising:

receiving and storing vendor location information and corresponding inventory for a plurality of vendors;

receiving a search request for a specified product entered by a user;

performing an electronic search and displaying search results comprising a plurality of vendors arranged by geographic location and each vendor comprising a separate associated selectable graphical user interface (GUI) hold button to enable a user to request a hold of a specified product;

receiving product of interest indication comprising a hold request via the GUI hold button for a specified product at a selected vendor location entered by the user; and storing the product of interest indication with respect to specific vendor locations of the plurality of vendors in a product of interest database.

2. The method of claim 1 further including summing product interest information for a group of vendors.

3. The method of claim 2 wherein the group of vendors are characterized by a geographic designation.

4. The method of claim 2 wherein the group of vendors are within the same portion of a city.

5. The method of claim 2 wherein the group of vendors are within the same state.

6. The method of claim 1 further including the step of monitoring sales of specific products at specific vendor locations.

7. The method of claim 1 further including the step of monitoring hold requests of specific products at specific vendor locations.

8. The method of claim 1 further including the step of monitoring search requests of specific products at consumer locations characterized by a geographic description.

9. The method of claim 8 wherein the geographic description is a portion of a city.

10. The method of claim 8 wherein the geographic description is a portion of a state.

11. The method of claim 8 wherein the geographic description is a portion of a county.

12. A method in a search engine, which is executable an a server, for facilitating an Internet-based transaction, comprising:

performing a search for a particular product offered by a plurality of vendors and displaying search results that are parsed according to geographic location relative to a user and price;

producing a selectable graphical user interface (GUI) hold button for display on a user's terminal for at least a plurality of the search results wherein each GUI hold button is associated with a different vendor from the others but for the same product;

upon receiving an indication of a hold selection as determined by the user selecting the GUI hold button in connection with the particular product listed in the plurality of search results, generating a communication to a specified vendor requesting that a specified product be put on hold for the user for the user to sample the particular product associated with the hold selection; and storing a record of the hold request in a database of product-of-interest records.

13. The method of claim 12 wherein the record includes a geographic discrete parameter relating to a vendor of the specified product.

14. The method of claim 13 wherein the geographic discrete parameter is one of a street address, a postal code, a geographic coordinate or a wireless telephone network work sector.

15. A search engine server for sequencing electronic search results, comprising:

a processor for executing computer instructions, the computer instructions defining operational logic of the apparatus;

computer readable media forming a database of product interest records;

the computer readable media further defining logic for generating a graphical user interface (GUI) hold button in association with the display of a plurality of vendors arranged by geographic location having a specified product to enable a user to request a hold of a particular product wherein each of the plurality of vendors has a hold button generated in connection therewith;

the computer readable media further defining logic for generating a hold request for sampling purposes to enable the user to sample the product at a specified geographic location from a specified vendor of the plurality of vendors arranged by geographic location; and a bus for connecting the processor to the memory to produce the computer instructions to the processor for execution wherein the computer instructions define operational logic defined within the computer readable media that prompts the processor to form the database to enable the processor to store the product interest records wherein the product of interest records map interest in a particular product by geographic area.

16. The search engine server of claim 15 wherein the logic further prompts the sewer to monitor sales.

17. The search engine server of claim 15 wherein the logic further prompts the server to monitor hold requests.

18. The search engine server of claim 15 wherein the logic further prompts the server to monitor product interest on a vendor by vendor level.

19. A method in a search engine, which is executable on a server, for performing product searches responsive to product search requests entered via a computer terminal, comprising:

receiving an electronically transmitted search request over a network;

performing a search for products defined in the search request;

listing and producing a plurality of search results on a vendor by vendor basis in relation to a geographic location specified by a user and transmitting the plurality of search results over the network; and as a part of listing and producing the plurality of search results, displaying a plurality of graphical user interface hold buttons, one for each of the plurality of search results to enable the user to select a hold request to sample a particular product listed in the plurality of search results offered by a corresponding vendor.

20. The method of claim 19 further including:

determining if the product search request is one that is to be monitored for product interest;

storing all transactions relating to the product search request in a product of interest database which maps product interest to a defined geographic area;

storing a geographic description of the stores for all transactions relating to the product search request;

analyzing stored records to determine product interest in the defined geographic area; and producing a report containing information relating to the analyzed stored records.

* * * * *